US010947839B2

(12) United States Patent
Cuthbert et al.

(10) Patent No.: US 10,947,839 B2
(45) Date of Patent: Mar. 16, 2021

(54) DOWNHOLE THERMAL ANOMALY DETECTION FOR PASSIVE RANGING TO A TARGET WELLBORE

(71) Applicant: Halliburton Energy Services, Inc., Houston, TX (US)

(72) Inventors: Andrew J. Cuthbert, Houston, TX (US); Joseph E. Hess, Richmond, TX (US); Carl J. Cramm, Houston, TX (US)

(73) Assignee: Halliburton Energy Sendees, Inc., Houston, TX (US)

( * ) Notice: Subject to any disclaimer, the term of this patent is extended or adjusted under 35 U.S.C. 154(b) by 597 days.

(21) Appl. No.: 15/316,494

(22) PCT Filed: Jul. 7, 2014

(86) PCT No.: PCT/US2014/045587

§ 371 (c)(1),
(2) Date: Dec. 5, 2016

(87) PCT Pub. No.: WO2016/007125

PCT Pub. Date: Jan. 14, 2016

(65) Prior Publication Data

US 2017/0145815 A1 May 25, 2017

(51) Int. Cl.

*E21B 47/103* (2012.01)
*E21B 47/022* (2012.01)
(Continued)

(52) U.S. Cl.

CPC .............. *E21B 47/103* (2020.05); *E21B 7/04* (2013.01); *E21B 47/022* (2013.01);
(Continued)

(58) Field of Classification Search

CPC ...... E21B 47/042; E21B 47/065; E21B 47/09; E21B 47/1005; E21B 47/101;
(Continued)

(56) References Cited

U.S. PATENT DOCUMENTS 4,845,434 A * 7/1989 Kuckes .................. G01R 33/04 324/346
2003/0094281 A1 5/2003 Tubel
(Continued)

FOREIGN PATENT DOCUMENTS

WO 2015178875 11/2015

OTHER PUBLICATIONS

International Search Report and Written Opinion of PCT Application No. PCT/US2014/045587 dated Mar. 31, 2015: pp. 1-14.

*Primary Examiner* — Christopher J Sebesta
(74) *Attorney, Agent, or Firm* — Chamberlain Hrdlicka

(57) ABSTRACT

A method can include measuring temperature along a relief wellbore, thereby detecting a temperature anomaly in an earth formation penetrated by the relief wellbore, and determining a location of an influx into a target wellbore, based on the temperature anomaly detecting. A thermal anomaly ranging system for use with a subterranean well can include a temperature sensor in a relief wellbore that penetrates an earth formation, the temperature sensor detecting a temperature anomaly in the formation, and the temperature anomaly being caused by an influx into a target wellbore. Another method can include measuring optical scattering in an optical waveguide positioned in a relief wellbore, thereby detecting a temperature anomaly in an earth formation penetrated by the relief wellbore, and determining a location of an influx into a target wellbore, based on the temperature anomaly detecting.

20 Claims, 11 Drawing Sheets

(51) Int. Cl.

| | |
|---|---|
| ***E21B 47/07*** | (2012.01) |
| ***E21B 47/047*** | (2012.01) |
| ***E21B 7/04*** | (2006.01) |
| ***G01V 9/00*** | (2006.01) |

(52) U.S. Cl.
CPC ............ *E21B 47/047* (2020.05); *E21B 47/07* (2020.05); *G01V 9/005* (2013.01)

(58) Field of Classification Search
CPC .. E21B 47/1015; E21B 47/102; E21B 47/103; E21B 47/022; E21B 47/07; E21B 47/047; E21B 7/04; G01V 9/005
See application file for complete search history.

(56) References Cited

U.S. PATENT DOCUMENTS

2005/0217350 A1 10/2005 Jabusch et al.
2007/0221407 A1 9/2007 Bostick, III et al.
2009/0027258 A1 1/2009 Stayton
2009/0272580 A1 11/2009 Dolman et al.
2012/0013339 A1* 1/2012 Kuckes ............ E21B 47/02216 324/346
2013/0118809 A1* 5/2013 Veeningen ............ E21B 47/02 175/45
2013/0161098 A1* 6/2013 Maida, Jr. ............ E21B 44/00 175/50
2014/0081574 A1* 3/2014 Hove .................... E21B 47/022 702/6
2015/0240623 A1* 8/2015 Blange ...................... E21B 7/04 166/250.01

* cited by examiner

DOWNHOLE THERMAL ANOMALY DETECTION FOR PASSIVE RANGING TO A TARGET WELLBORE

TECHNICAL FIELD

This disclosure relates generally to equipment utilized and operations performed in conjunction with a subterranean well and, in one example described below, more particularly provides downhole thermal anomaly detection for passive ranging to a target wellbore.

BACKGROUND

A relief wellbore can be drilled to intersect or otherwise establish fluid communication with a target wellbore. Typically, an undesired and uncontrolled influx into the target wellbore is occurring while the relief wellbore is being drilled. When fluid communication between the relief and target wellbores is established, measures can be taken to stop, or at least control, the influx into the target wellbore. Therefore, it will appreciated that improvements are continually needed in the art of ranging from a relief wellbore to a target wellbore.

DETAILED DESCRIPTION

Figure 1:
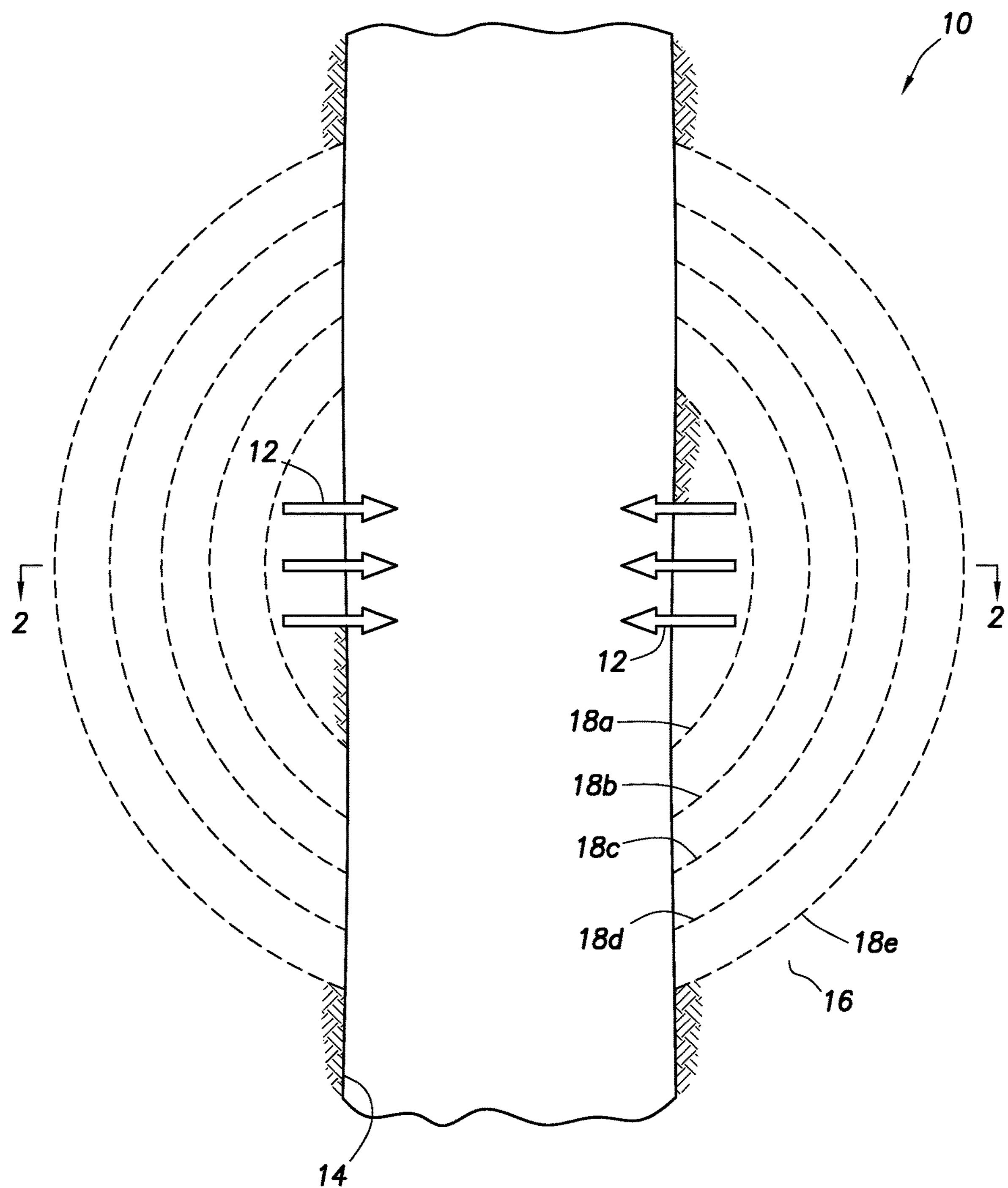
FIG. 1 is a representative cross-sectional view of a well system and associated method which can embody principles of this disclosure.
Figure 2:
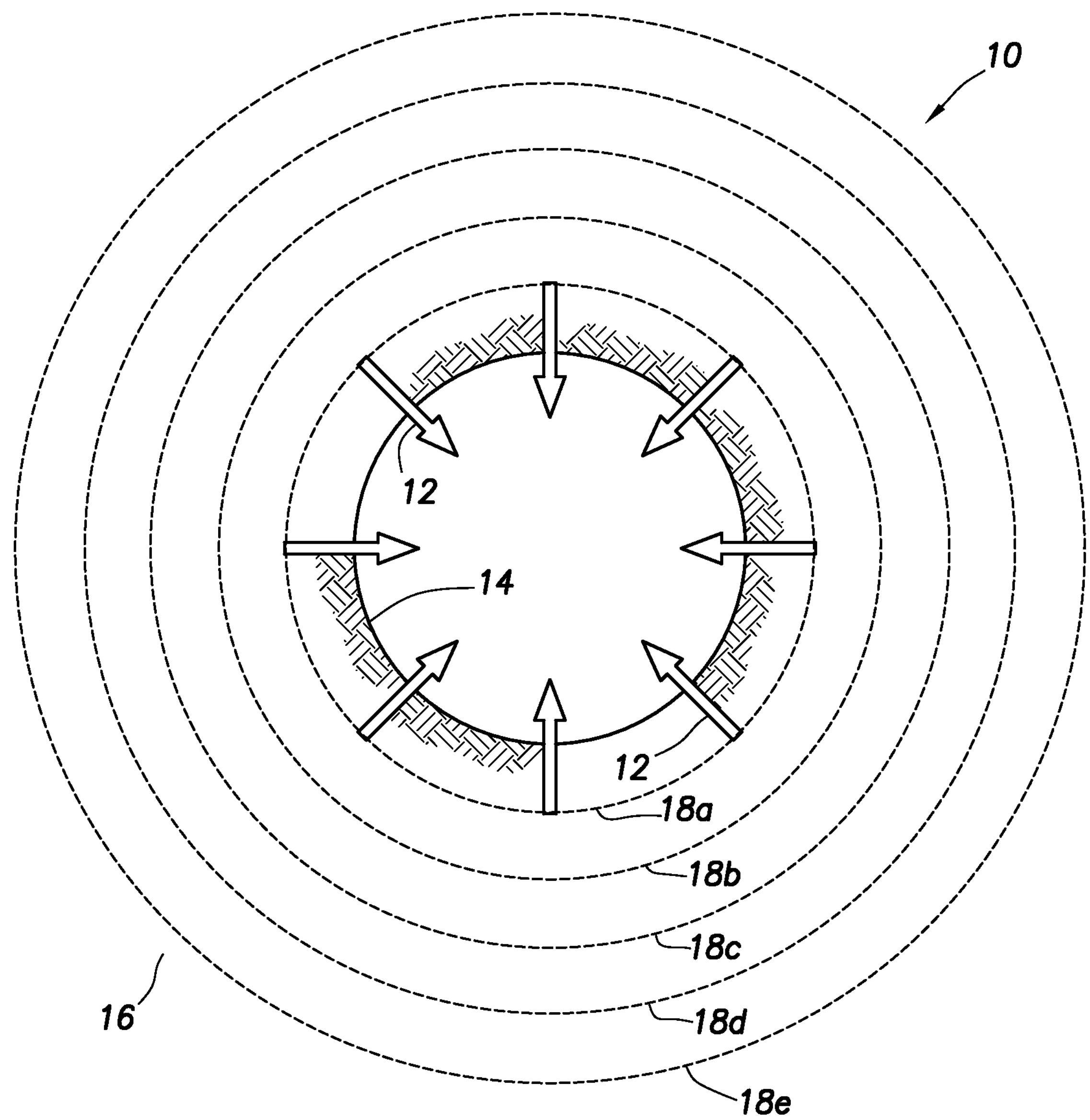
FIG. 2 is a representative cross-sectional view of the system, taken along line 2-2 of FIG. 1.

Representatively illustrated in FIGS. 1 & 2 is a system 10 for use with a subterranean well, and an associated method, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIGS. 1 & 2 example, an undesired and uncontrolled influx 12 is flowing into a target wellbore 14. It is desired to stop, or at least control, the influx 12.

For this purpose, a relief wellbore (not shown in FIGS. 1 & 2, see FIGS. 9, 10 & 12) is to be drilled to establish fluid communication with the target wellbore 14. In order to determine where fluid communication should be established between the relief wellbore and the target wellbore 14, it is highly desirable to accurately know a location of the influx 12.

In the FIGS. 1 & 2 example, the target wellbore 14 is uncased or open hole at the location of the influx 12. Thus, prior methods of ranging to a target wellbore (e.g., wherein a magnetic field sensor is positioned in a relief wellbore and used to detect ferromagnetic materials in the target wellbore) are of no use to locate the target wellbore, and certainly cannot be used to determine a location of the influx 12 into the target wellbore 14.

However, the principles of this disclosure can be used to locate an influx into a cased or an uncased portion of a target wellbore. Thus, the scope of this disclosure is not limited to any particular influx location, or whether the influx is in a cased or uncased portion of a target wellbore.

The present inventors have conceptualized that the influx 12 will be associated with a mobilization of fluids in and from an earth formation 16 surrounding the target wellbore 14, and will thus result in a temperature anomaly comprising a deviation from a normal geothermal gradient in the formation. Various heat transfer mechanisms (e.g., convection, conduction, dilation of gases, etc.) and thermal effects (e.g., Bernoulli's principle, Joule-Thomson effect, etc.) can be involved in producing the temperature anomaly, and so it should be clearly understood that the scope of this disclosure is not limited to any particular thermal or heat transfer principle that causes the temperature anomaly due to the presence of the influx 12.

Note that the temperature anomaly referred to above comprises a temperature deviation in the formation 16 itself. There may also be other temperature anomalies, for example, fluids flowing into the relief wellbore 14 can result in a change in temperature in the relief wellbore itself. In addition, a change in temperature in the relief wellbore 14 can contribute to the temperature deviation in the formation 16.

In the FIGS. 1 & 2 example, several representative temperature gradients 18*a-e* in are depicted in the formation 16 for purposes of discussion. However, it is not necessary in keeping with the scope of this disclosure for temperature gradients in an actual formation to be configured as in the FIGS. 1 & 2 example. Instead, since multiple complex heat transfer mechanisms may be at work, it is expected that actual temperature gradients in a formation surrounding an influx into a target wellbore will have corresponding complex shapes.

Note that the temperature gradients 18*a-e* depicted in FIGS. 1 & 2 do not necessarily represent temperature increases or decreases in a direction away from the influx 12. Instead, depending on a composition of the influx 12, temperature in the formation 16 may increase, or it may decrease in a direction away from the influx.

For example, if the influx 12 composition is gaseous, and the influx results in a pressure decrease in the formation 16, expansion of gas in the formation could produce a temperature decrease. As another example, if the influx 12 composition is liquid in the target wellbore 14, as the influx displaces up the target wellbore, this will result in heating of the wellbore above the influx, which will result in heating of the surrounding formation 16.

Thus, the scope of this disclosure is not limited to only an increase or only a decrease in temperature in the formation 16. Indeed, circumstances can be envisioned in which one portion of the formation 16 may experience an increase in temperature due to the influx 12, and another portion of the formation may experience a decrease in temperature due to the same influx.

Referring additionally now to FIGS. 3-6, theoretical plots of measured depth (MD) along the target wellbore 14 versus temperature in the formation 16 are representatively illustrated. In this example, the influx 12 is located at 10,000 ft. (~3050 meters) measured depth along the target wellbore 14, and is flowing into the target wellbore at a certain known flow rate.

Figure 3:
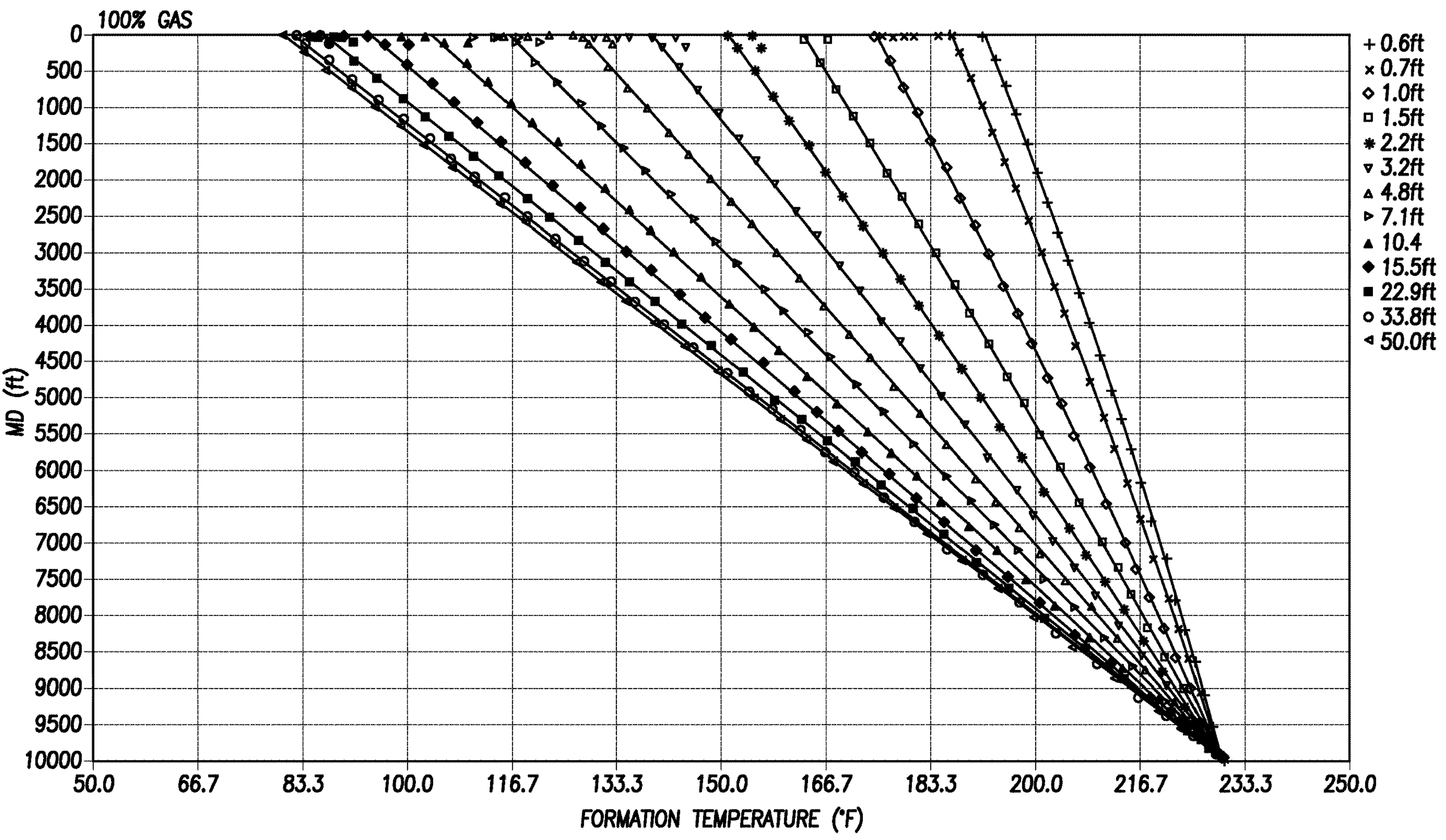
FIGS. 3-6 are representative plots of measured depth versus formation temperature for various respective influx compositions and various distances from a target wellbore.
Figure 4:
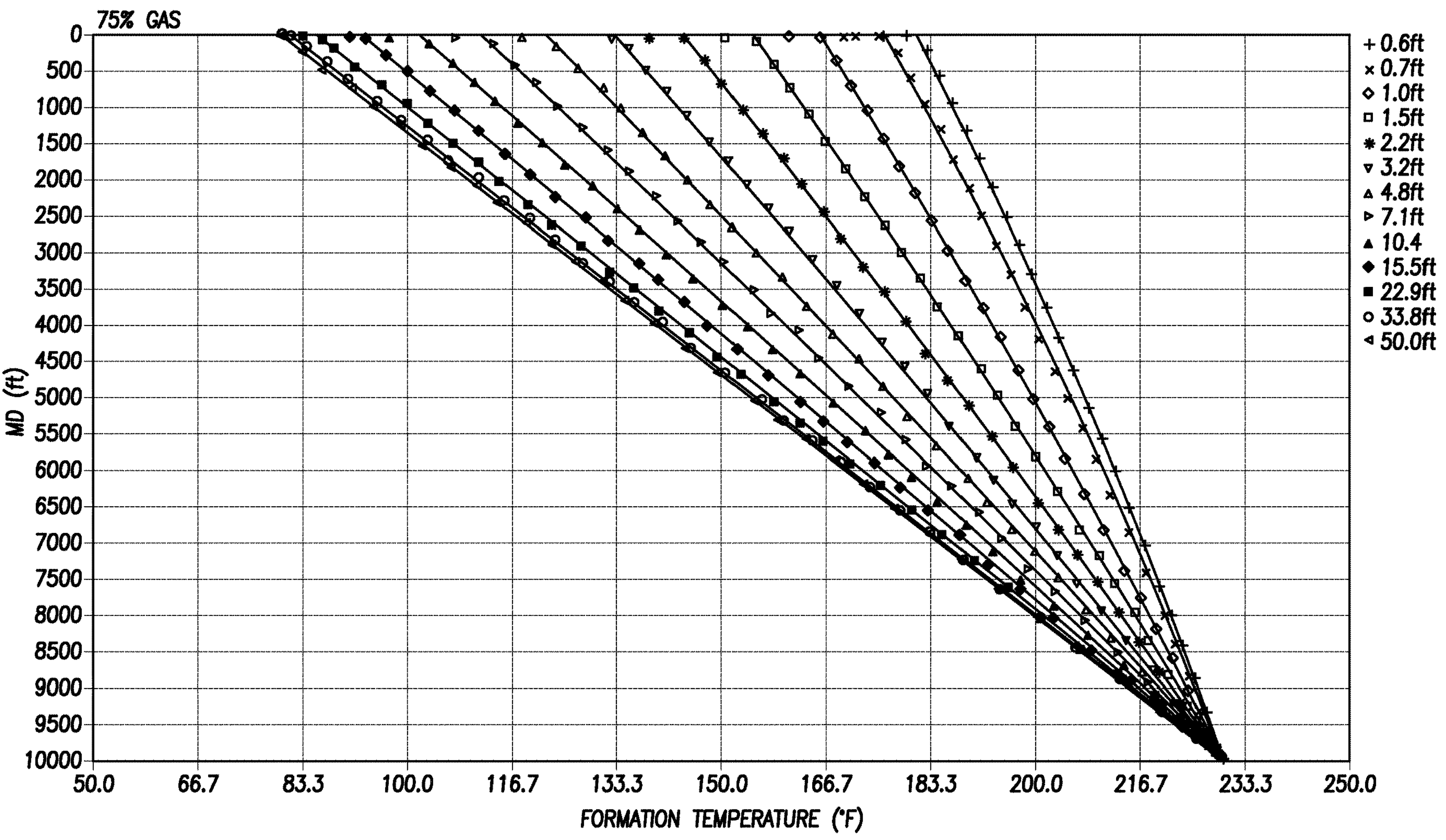
Figure 5:
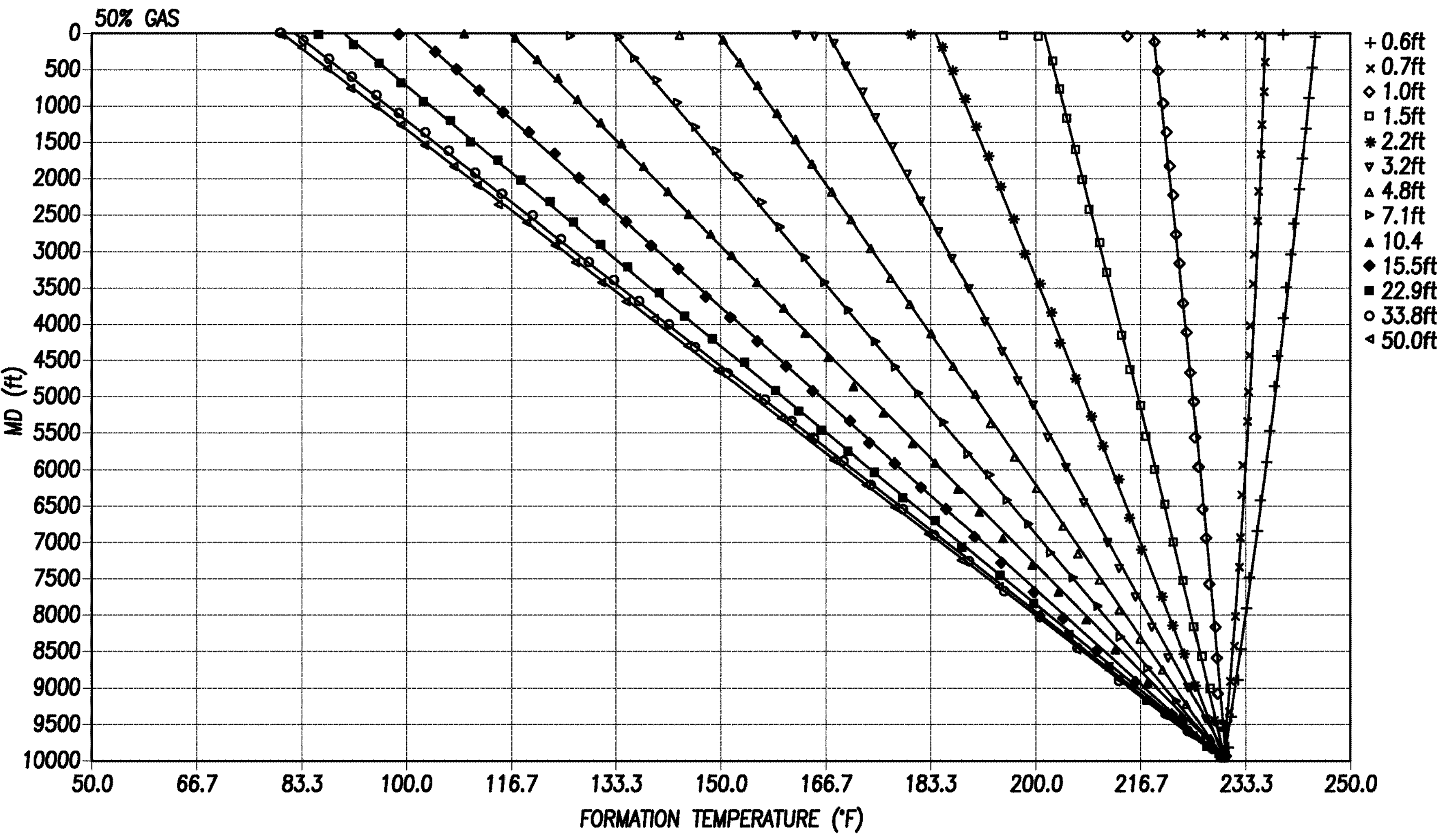
Figure 6:
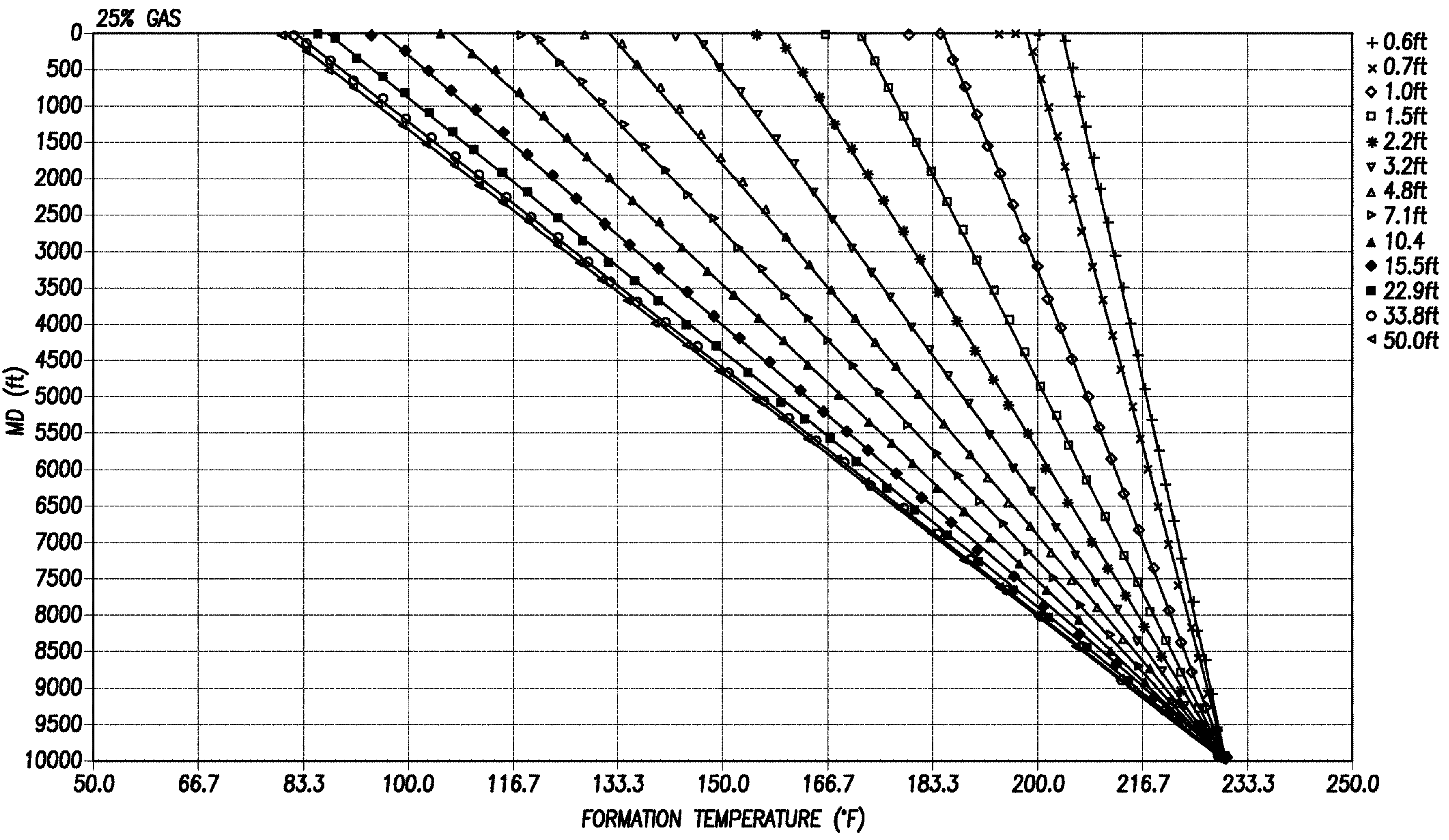

FIG. 3 is for an influx 12 composition of 100% gas, FIG. 4 is for an influx composition of 75% gas, FIG. 5 is for an influx composition of 50% gas, and FIG. 6 is for an influx composition of 25% gas. In each of FIGS. 3-6, depth versus formation temperature is plotted for a variety of distances from the target wellbore 14.

It will be appreciated that, in this example, if the composition of the influx 12 is known and the flow rate of the influx is known (in some circumstances, these parameters can be measured, or at least deduced, from the flow of fluids from the target wellbore 14), then a certain temperature in the formation 16 will be measured at a corresponding distance from the target wellbore at a particular depth. Thus, if a certain temperature is measured in the formation 16 at a particular depth, and the influx 12 composition and flow rate are known, then a distance to the target wellbore 14 can be deduced.

Conversely, if a distance to the target wellbore 14 is accurately known (in many circumstances, accurate surveys of the target wellbore are available), then a certain temperature in the formation 16 should be measured if the influx 12 has a certain composition and flow rate. Thus, if a certain temperature is measured in the formation 16 at a particular depth, and the distance to the target wellbore 14 is known, then a composition and/or flow rate of the influx 12 can be deduced.

In FIGS. 3-6, the composition of the influx 12 varies with gas content. However, other variations in composition could be evaluated, such as, oil/water ratio, etc.

Figure 7:
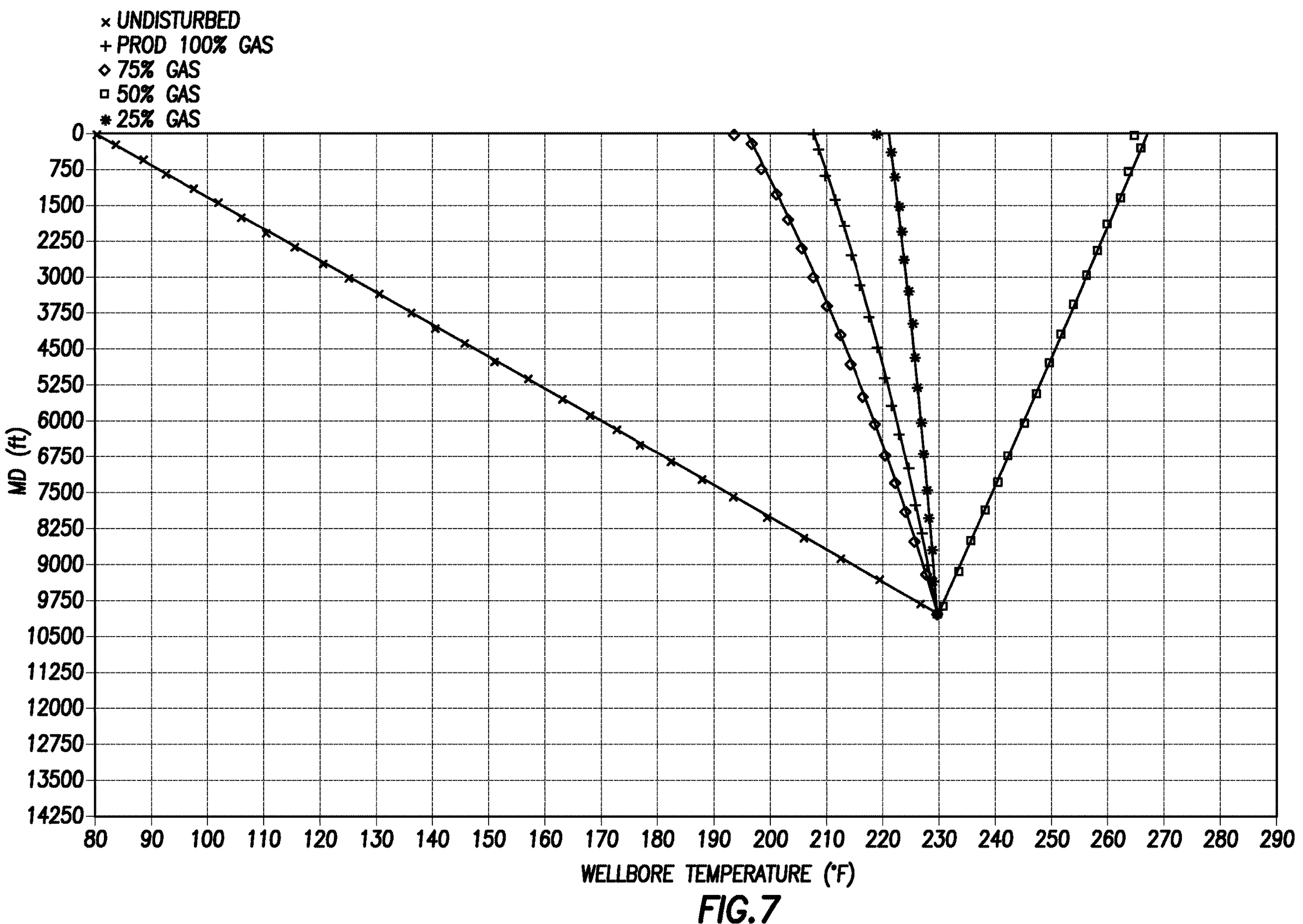
FIG. 7 is a representative plot of measured depth versus relief wellbore temperature for various influx compositions.

Referring additionally now to FIG. 7, a theoretical plot of measured depth (MD) versus temperature in the target wellbore 14 is representatively illustrated. Note that a theoretical undisturbed geothermal gradient along the target wellbore 14 is provided in FIG. 7 for reference. Separate plots are provided in FIG. 7 for corresponding different influx 12 compositions (100% gas, 75% gas, 50% gas and 25% gas).

Note how the depth versus temperature plots differ for the different influx 12 compositions (for example, the plots clearly have different slopes), indicating that the target wellbore 14 temperature will change with depth, based on the particular influx composition flowing through the target wellbore. As mentioned above, the temperature of the target wellbore 14 can affect the temperature of the formation 16 surrounding the target wellbore. Thus, measuring how the temperature in the formation 16 changes with depth provides another technique for determining the composition and location of the influx 12.

Figure 8:
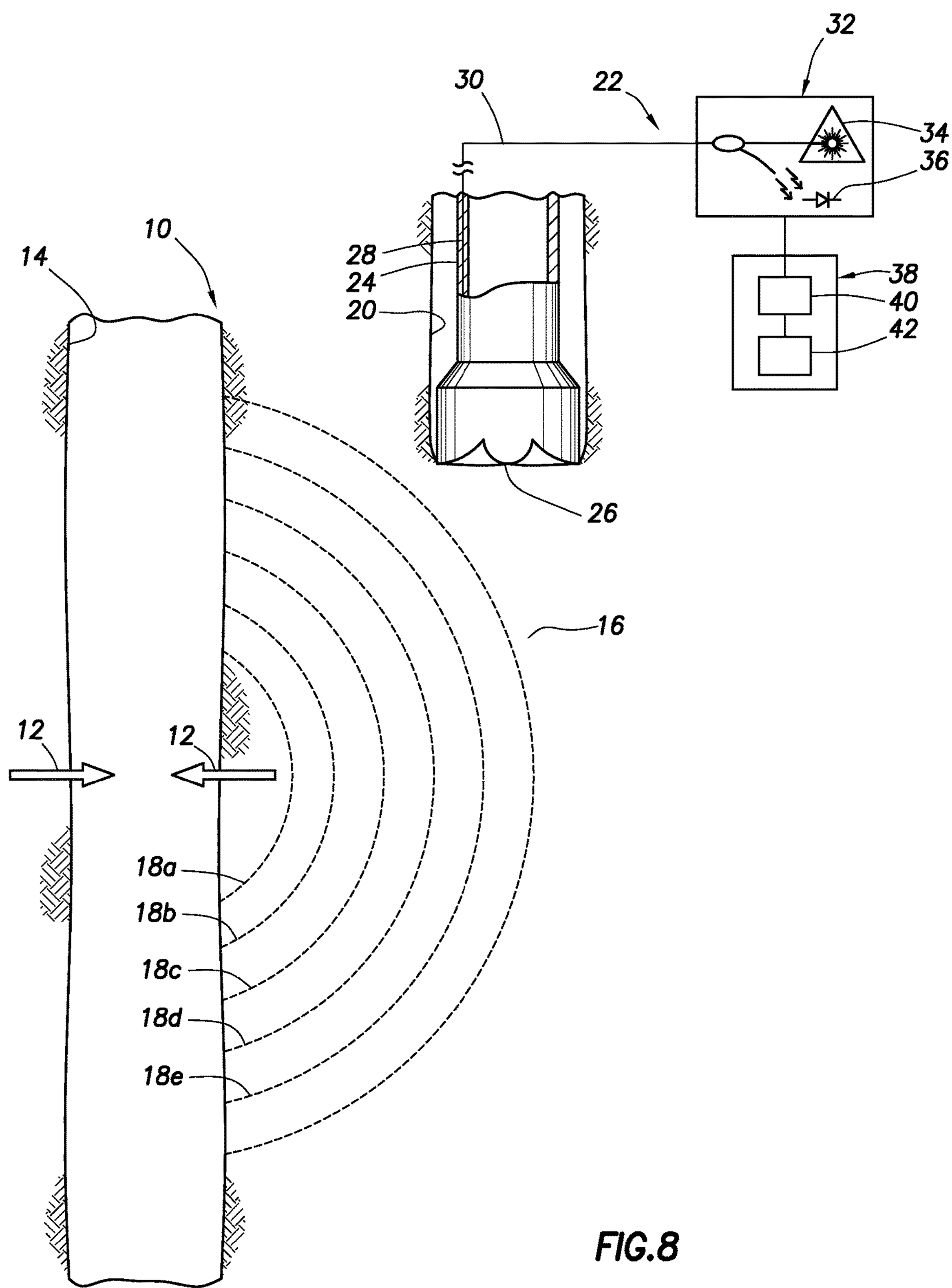
FIG. 8 is a representative partially cross-sectional view of the system and method, wherein a relief wellbore is being drilled.

Referring additionally now to FIG. 8, the system 10 and method are representatively illustrated with a relief wellbore 20 being drilled. Also depicted in FIG. 8 is a thermal anomaly ranging system 22 that can be used to locate the influx 12, so that fluid communication can be established with the target wellbore 14 as desired relative to the location of the influx (e.g., above, below or at the influx).

In the FIG. 8 example, the relief wellbore 20 is being drilled with a drill string 24 having a drill bit 26 at a distal end thereof. Any method, technique or equipment (such as, rotary, percussion or jet drilling with continuous or segmented drill pipe, etc.) may be used to drill the relief wellbore 20 in keeping with the principles of this disclosure.

A temperature sensor 28 is positioned in a wall of the drill string 24. In other examples, the temperature sensor 28 could be internal or external to the drill string 24. In some examples, the temperature sensor 28 could be positioned in the relief wellbore 20 separate from the drill string 24. For example, the temperature sensor 28 could be run on wireline, coiled tubing or another type of conveyance into the relief wellbore 20 when the drill string 24 is not present in the relief wellbore.

The temperature sensor 28 can be a distributed temperature sensor capable of measuring temperature at various locations, or continuously, longitudinally along the relief wellbore 20. One or more discrete temperature sensors or a continuous temperature sensor may be used in keeping with the principles of this disclosure.

In the FIG. 8 example, the temperature sensor 28 includes an optical waveguide 30 (such as, an optical fiber or optical ribbon). The optical waveguide 30 extends to an optical interrogator 32 positioned, for example, at a surface location.

The optical interrogator 32 is depicted schematically in FIG. 8 as including an optical source 34 (such as, a laser or a light emitting diode) and an optical detector 36 (such as, an opto-electric converter or photodiode). The optical source 34 launches light (electromagnetic energy) into the waveguide 30, and light returned to the interrogator 32 is detected by the detector 36. Note that it is not necessary for the light to be launched into a same end of the optical waveguide 30 as an end via which light is returned to the interrogator 32.

Other or different equipment (such as, an interferometer or an optical time domain or frequency domain reflectometer) may be included in the interrogator 32 in some examples. The scope of this disclosure is not limited to use of any particular type or construction of optical interrogator.

A computer 38 is used to control operation of the interrogator 32, and to record optical measurements made by the interrogator. In this example, the computer 38 includes at least a processor 40 and memory 42. The processor 40 operates the optical source 34, receives measurement data from the detector 36 and manipulates that data. The memory 42 stores instructions for operation of the processor 40, and stores processed measurement data. The processor 40 and memory 42 can perform additional or different functions in keeping with the scope of this disclosure.

In other examples, different types of computers may be used, and the computer 38 could include other equipment (such as, input and output devices, etc.). The computer 38 could be integrated with the interrogator 32 into a single instrument. Thus, the scope of this disclosure is not limited to use of any particular type or construction of computer.

The optical waveguide 30, interrogator 32 and computer 38 may comprise a distributed temperature sensing (DTS) system capable of detecting temperature as distributed along the optical waveguide. For example, the interrogator 44 could be used to measure a ratio of Stokes and anti-Stokes components of Raman scattering in the optical waveguide 30 as an indication of temperature as distributed along the waveguide in a distributed temperature sensing (DTS) system. In other examples, Brillouin scattering may be detected as an indication of temperature as distributed along the optical waveguide 30.

Figure 9:
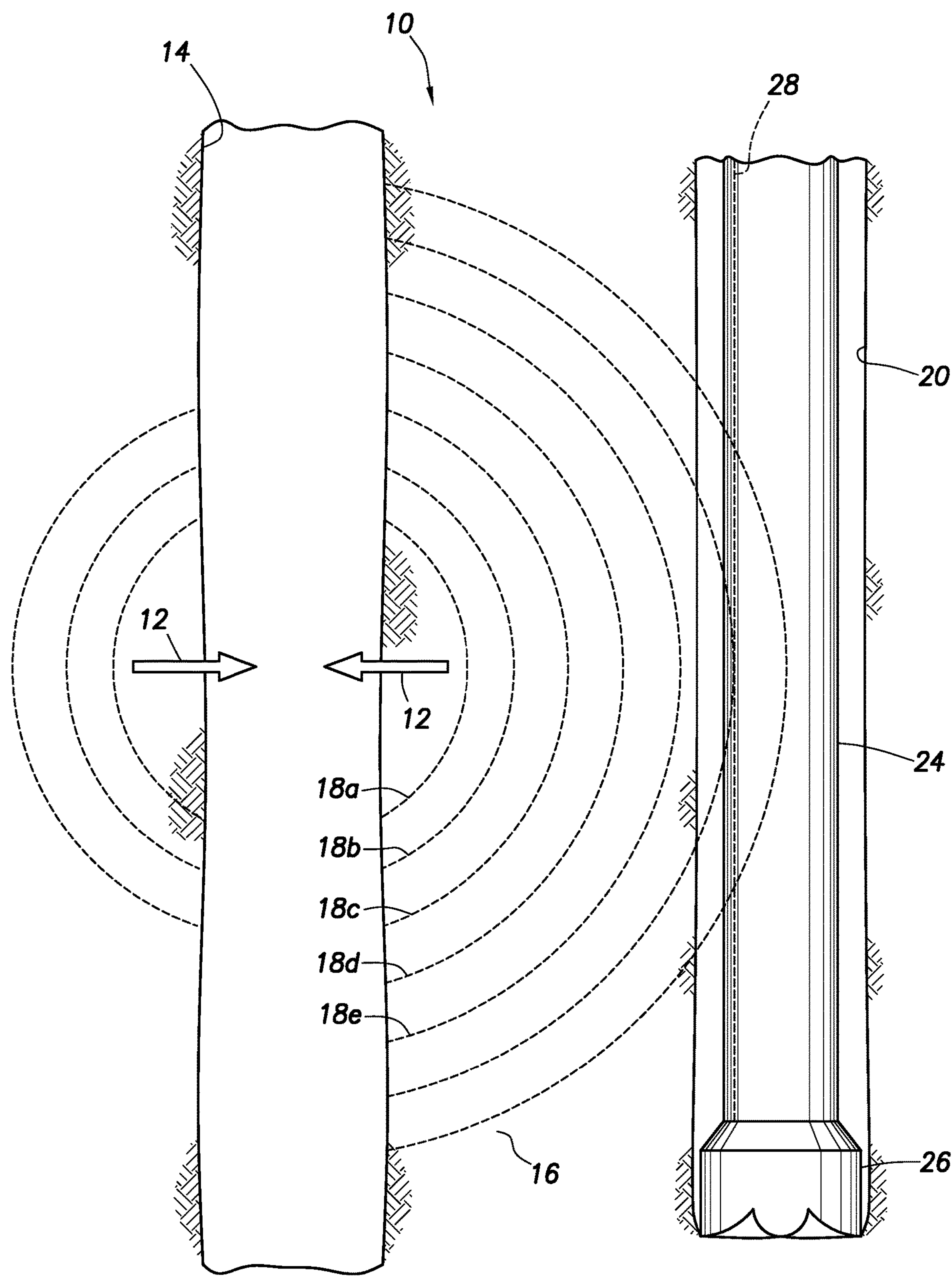
FIG. 9 is a representative partially cross-sectional view of the system and method, wherein a temperature anomaly is detected by a temperature sensor in the relief wellbore.

Referring additionally now to FIG. 9, the well system 10 is representatively illustrated with the relief wellbore 20 drilled sufficiently close to the influx 12 in the target wellbore 14, so that the temperature sensor 28 is able to detect some of the thermal gradients 18*a-e* due to the influx. It can now be determined that the detected thermal gradients 18*a-e* indicate a thermal anomaly due to the influx 12.

Note that it is not necessary for the relief wellbore 20 to be drilled past (e.g., deeper than) the influx 12, in order for the influx location to be determined. Instead, in some examples, some of the thermal gradients 18*a-e* can be detected as the relief wellbore 20 approaches a depth of the influx 12.

As indicated in the examples of FIGS. 3-7, significant deviations from the geothermal gradient exist in the formation 16, even as much as 500 ft. (~152.5 meters) above the influx 12, if the relief wellbore 20 is sufficiently close to the target wellbore 14. Of course, as a distance from the temperature sensor 28 to the target wellbore 14 and the influx 12 increases, the more difficult it will be to detect the thermal anomaly due to the influx.

Again, it is not necessary for the temperature sensor 28 to be positioned in the drill string 24. In some examples, as the location of the influx 12 is approached, it may be appropriate to conduct surveys with the sensor 28 (e.g., using wireline or coiled tubing to convey the sensor) with increased frequency, in order to improve accuracy of ranging to the influx location.

Note that it is not necessary to precisely measure an absolute value for temperature in the formation 16, in order to locate the influx 12 in all examples. Instead, in some examples, it may be sufficient to detect the thermal anomaly by detecting temperature changes or deviations (e.g., deviations from the geothermal gradient), rather than absolute temperature values.

Figure 10:
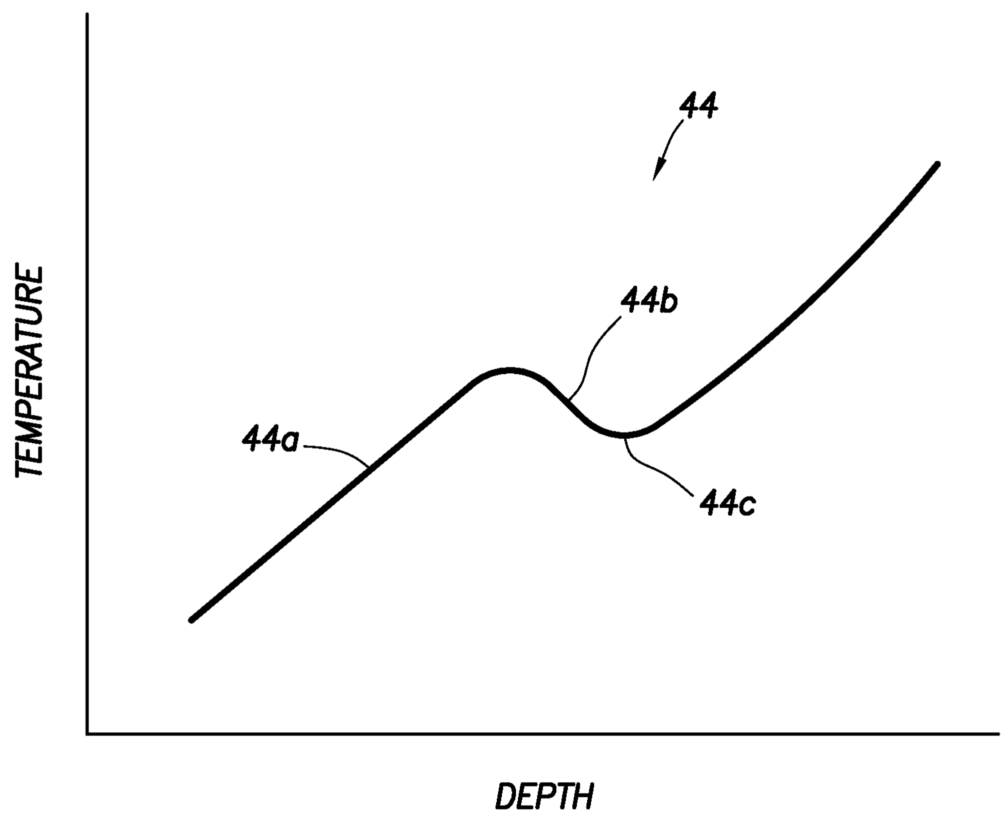
FIG. 10 is a representative plot of measured temperature in the relief wellbore versus depth.

Referring additionally now to FIG. 10, a theoretical plot 44 of temperature in the formation 16 (as measured by the temperature sensor 28) versus depth is representatively illustrated. The plot depicted in FIG. 10 may represent multiple temperature measurements made by one or more discrete temperature sensor(s) 28, or the plot may represent a distributed temperature measurement made, for example, by the DTS system described above using the optical waveguide 30.

Note that, as depth increases, the plot 44 initially follows an expected geothermal gradient in the formation 16 (as at 44*a*). However, at a certain depth, the sensed temperature begins to decrease (as at 44*b*).

Such a temperature decrease could be due to, for example, gas flowing into, and expanding in, the target wellbore 14. In other examples, liquid flowing into the target wellbore 14 from the formation 16 could result in a sensed temperature at a particular depth being greater than the expected geothermal gradient.

At a certain depth, the plot 44 attains a local minimum (as at 44*c*), representing a local minimum temperature in the formation 16. This depth may correspond to the location of the influx 12 along the target wellbore 14. However, since gas can continue to expand as it flows upward in the target wellbore, a local temperature minimum is not necessarily at an exact same depth as an influx.

At depths beyond the local minimum 44*c*, the temperature increases again, eventually increasing to the geothermal gradient in the formation 16. Thus, the plot 44 depicts a thermal anomaly in the formation 16 that can be correlated to the location of the influx 12, so that an informed decision can be made as to where and how fluid communication should be established between the target and relief wellbores 14, 20.

Figure 11:
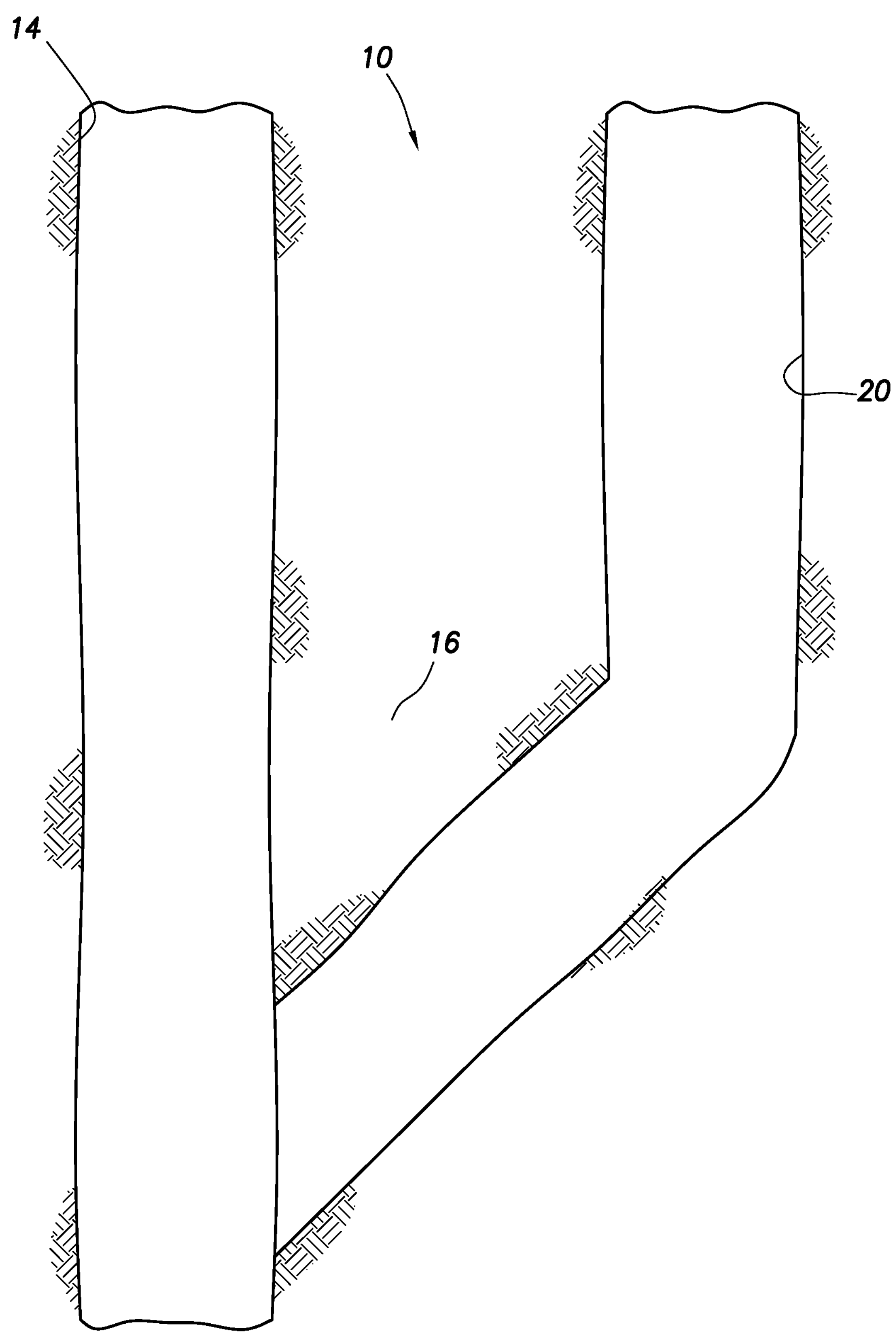
FIG. 11 is a representative cross-sectional view of the system and method, wherein fluid communication is established between the relief and target wellbores.

Referring additionally now to FIG. 11, the well system is representatively illustrated after direct fluid communication has been established between the target and relief wellbores 14, 20. Physical access between the target and relief wellbores 14, 20 is also provided in the example depicted in FIG. 11, although direct physical access is not necessary in keeping with the scope of this disclosure.

In this example, the relief wellbore 20 is drilled toward the target wellbore 14, until the relief wellbore intersects the target wellbore, for example, using directional drilling techniques. However, in other examples other techniques (such as, lateral wellbore drilling, short radius jet drilling, explosives as described in International application no. PCT/US14/38520 filed 17 May 2014, etc.) may be used to establish fluid communication with the target wellbore 14. Thus, the scope of this disclosure is not limited to any particular technique for establishing fluid communication between the target and relief wellbores 14, 20.

Fluid communication may be established with the target wellbore 14 above, below or at the location of the influx 12 (not shown in FIG. 11, see FIG. 9). Because the principles described above provide for determining the location of the influx 12, a decision as to where to establish fluid communication with the target wellbore 14 can be made with increased confidence.

It may now be fully appreciated that the above disclosure provides significant advancements to the art of ranging from a relief wellbore to a target wellbore. In examples described above, measurements of temperature in the relief wellbore 20 (which temperature measurements correspond to temperatures in the formation 16) can be used to determine the location of the influx 12 into the target wellbore 14.

A method is provided to the art by the above disclosure. In one example, the method can comprise: measuring temperature along a relief wellbore 20, thereby detecting a temperature anomaly in an earth formation 16 penetrated by the relief wellbore 20; and determining a location of an influx 12 into a target wellbore 14, based on the temperature anomaly detecting.

The temperature anomaly may be produced in response to the influx 12 into the target wellbore 14.

The method can also include determining a flow rate and/or composition of the influx 12 into the target wellbore 14, based on the temperature anomaly detecting.

The temperature anomaly may comprise a deviation from a geothermal gradient in the formation 16.

The measuring step can comprise detecting optical scattering in an optical waveguide 30 positioned in the relief wellbore 20.

The method can include establishing fluid communication between the relief and target wellbores 20, 14 after the determining step.

The location of the influx 12 may be at an open hole portion of the target wellbore 14.

A thermal anomaly ranging system 22 for use with a subterranean well is also provided to the art by the above disclosure. In one example, the system 22 can include a temperature sensor 28 in a relief wellbore 20 that penetrates an earth formation 16. The temperature sensor 28 detects a temperature anomaly in the formation 16, the temperature anomaly being caused by an influx 12 into a target wellbore 14.

The temperature sensor 28 may comprise an optical waveguide 30. The system can include an optical interrogator 32 that measures scattering in the optical waveguide 30.

Another method described above can include measuring optical scattering in an optical waveguide 30 positioned in a relief wellbore 20, thereby detecting a temperature anomaly in an earth formation 16 penetrated by the relief wellbore 20; and determining a location of an influx 12 into a target wellbore 14, based on the temperature anomaly detecting.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method, comprising:
- measuring temperature along a relief wellbore, thereby detecting a temperature anomaly in an earth formation penetrated by the relief wellbore; and
- determining a location of an influx into a target wellbore, based on the temperature anomaly detecting.

2. The method of claim 1, wherein the temperature anomaly is produced in response to the influx into the target wellbore.

3. The method of claim 1, further comprising determining a flow rate of the influx into the target wellbore, based on the temperature anomaly detecting.

4. The method of claim 1, further comprising determining a composition of the influx into the target wellbore, based on the temperature anomaly detecting.

5. The method of claim 1, wherein the temperature anomaly comprises a deviation from a geothermal gradient in the formation.

6. The method of claim 1, wherein the measuring comprises detecting optical scattering in an optical waveguide positioned in the relief wellbore.

7. The method of claim 1, further comprising establishing fluid communication between the relief and target wellbores after the determining.

8. The method of claim 1, wherein the location of the influx is at an open hole portion of the target wellbore.

9. A thermal anomaly ranging system for use with a subterranean well, comprising:
- a temperature sensor in a relief wellbore that penetrates an earth formation, wherein the temperature sensor detects a temperature anomaly in the formation, the temperature anomaly being caused by an influx into a target wellbore.

10. The system of claim 9, wherein the temperature sensor comprises an optical waveguide.

11. The system of claim 10, further comprising an optical interrogator that measures scattering in the optical waveguide.

12. The system of claim 9, wherein the temperature anomaly comprises a deviation from a geothermal profile in the formation.

13. The system of claim 9, wherein the influx is at an open hole portion of the target wellbore.

14. A method, comprising:
- measuring optical scattering in an optical waveguide positioned in a relief wellbore, thereby detecting a temperature anomaly in an earth formation penetrated by the relief wellbore; and
- determining a location of an influx into a target wellbore, based on the temperature anomaly detecting.

15. The method of claim 14, wherein the temperature anomaly is produced in response to the influx into the target wellbore.

16. The method of claim 14, further comprising determining a flow rate of the influx into the target wellbore, based on the temperature anomaly detecting.

17. The method of claim 14, further comprising determining a composition of the influx into the target wellbore, based on the temperature anomaly detecting.

18. The method of claim 14, wherein the temperature anomaly comprises a deviation from a geothermal gradient in the formation.

19. The method of claim 14, further comprising establishing fluid communication between the relief and target wellbores after the determining.

20. The method of claim 14, wherein the location of the influx is at an open hole portion of the target wellbore.

* * * * *